US012781770B2

(12) United States Patent
Weber

(10) Patent No.: US 12,781,770 B2
(45) Date of Patent: Nov. 3, 2026

(54) HYDRAULIC ACCUMULATOR

(71) Applicant: Hydac Technology GmbH, Sulzbach / Saar (DE)

(72) Inventor: Norbert Weber, Saarsbrücken (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 337 days.

(21) Appl. No.: 18/698,195

(22) PCT Filed: Jan. 18, 2023

(86) PCT No.: PCT/EP2023/051122

§ 371 (c)(1),
(2) Date: Apr. 3, 2024

(87) PCT Pub. No.: WO2023/147997

PCT Pub. Date: Aug. 10, 2023

(65) Prior Publication Data

US 2025/0250995 A1 Aug. 7, 2025

(30) Foreign Application Priority Data

Feb. 1, 2022 (DE) ..................... 10 2022 000 382.1

(51) Int. Cl.
*F15B 1/24* (2006.01)
*F15B 21/041* (2019.01)

(52) U.S. Cl.
CPC .............. *F15B 1/24* (2013.01); *F15B 21/041* (2013.01); *F15B 2201/205* (2013.01); (Continued)

(58) Field of Classification Search
CPC .... F15B 1/24; F15B 21/041; F15B 2201/205; F15B 2201/31; F15B 2201/4053; F15B 2201/41; F15B 2211/655
See application file for complete search history.

(56) References Cited

U.S. PATENT DOCUMENTS 2,887,230 A * 5/1959 Sicard .................. B03C 1/0332 210/222
3,193,815 A 7/1965 Prestel .......................... 340/236
(Continued)

FOREIGN PATENT DOCUMENTS

CN 111 396 379 7/2020 ................ F15B 1/04
DE 19 00 273 9/1964
DE 103 20 799 6/2004 .............. B60T 17/04

OTHER PUBLICATIONS

Search report for International Application No. PCT/EP2023/051122, 5 pages, Mar. 24, 2023.

*Primary Examiner* — David R Deal
(74) *Attorney, Agent, or Firm* — Slayden Grubert Beard PLLC

(57) ABSTRACT

The invention relates to a hydraulic accumulator, in particular in the form of a piston accumulator, comprising a separation element (10), which is arranged in an accumulator housing (14) and separates two fluid chambers (16, 18) in a fluid-tight manner, in particular a closed-off storage chamber (20) containing a working gas, from a liquid chamber (22) containing an operating liquid, such as hydraulic oil, a fluid connection (24) being connected in a fluid-conducting manner to one of the fluid chambers (18), characterised in that a magnetic-field-generating device (42) is received in a part of the accumulator housing (14) which comprises the fluid connection (24), in such a way that magnetisable particles can be separated, in a cleaning manner, from the fluid located between the part of the storage housing (14) and the separation element (10) and deposited in the direction of the magnetic-field-generating device (42), on the latter.

12 Claims, 2 Drawing Sheets

(52) U.S. Cl.
CPC ... *F15B 2201/31* (2013.01); *F15B 2201/4053* (2013.01); *F15B 2201/41* (2013.01); *F15B 2211/655* (2013.01)

(56) References Cited

U.S. PATENT DOCUMENTS

| | | | | |
|---|---|---|---|---|
| 3,784,011 A * | 1/1974 | Ward | B01D 29/055 | 210/167.03 |
| 10,610,872 B2 * | 4/2020 | Gaertner | B03C 1/288 | |
| 2001/0006161 A1 * | 7/2001 | Tulchinskiy | B03C 1/286 | 210/695 |
| 2002/0096464 A1 * | 7/2002 | Simonson | B01D 35/06 | 210/232 |
| 2003/0116493 A1 * | 6/2003 | Elsegood | B03C 1/288 | 29/896.62 |
| 2006/0054402 A1 | 3/2006 | Dorian | 184/1.5 | |
| 2007/0262028 A1 * | 11/2007 | Flaherty | B03C 1/286 | 210/695 |
| 2008/0067130 A1 * | 3/2008 | Hall | B01D 35/06 | 210/695 |
| 2008/0149549 A1 * | 6/2008 | Lee | B03C 1/288 | 210/223 |
| 2013/0105379 A1 * | 5/2013 | Lee | B01D 29/21 | 210/222 |
| 2014/0027364 A1 * | 1/2014 | Vale | B03C 1/0332 | 210/223 |
| 2014/0374334 A1 * | 12/2014 | Schneider | B03C 1/0332 | 210/223 |
| 2018/0045092 A1 | 2/2018 | Shin | F01M 11/04 | |

* cited by examiner

HYDRAULIC ACCUMULATOR

CROSS-REFERENCE TO RELATED APPLICATIONS

This application claims priority to German Patent Application No. DE 10 2022 000 382.1, filed on Feb. 1, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a hydraulic accumulator, in particular in the form of a piston accumulator, comprising a separating element, which is arranged in an accumulator housing and separates two fluid chambers in a fluid-tight manner, in particular a closed accumulator chamber containing a working gas, from a liquid chamber containing an operating liquid, such as hydraulic oil, a fluid port being connected in a fluid-conducting manner to one of the fluid chambers.

Hydraulic accumulators, such as (hydropneumatic) piston accumulators, are used in hydraulic systems to receive defined volumes of pressurised liquid, such as hydraulic oil, and return them to the system if necessary. In the hydropneumatic piston accumulators that are usually used, in which the piston separates the oil-side liquid chamber from the accumulator chamber contained in the accumulator housing that receives a working gas such as nitrogen gas, the position of the piston changes during operation of the hydraulic accumulator such that the hydraulic accumulator receives hydraulic oil when the pressure rises, with the working gas being compressed at the same time in the other fluid or accumulator chamber during this process. When the pressure falls, the gas thus compressed expands again and in the process pushes stored hydraulic oil back into the hydraulic operating circuit. Due to the resulting changes in the volumes of the working chambers arising during operation, this results in a corresponding axial movement of the piston inside the accumulator housing in each case.

As such, in connection with operation of hydraulic devices such as operating cylinders, for example, corresponding hydraulic accumulators are connected to the hydraulic operating circuit, which generally comprises filter devices with filter elements to clean particulate contamination from an operating fluid, such as hydraulic oil, and said filter devices can, if necessary, be replaced with new elements. Despite these filter devices, the possibility cannot be ruled out that contaminated particles might pass to the clean side of the fluid and then cause damage in the corresponding accumulator and its components once inside the hydraulic accumulator. Filter elements are also limited with regard to their throughput capacity, with the result that these cannot always be used with very high flow rates and corresponding high fluid pressures. Particularly when using piston accumulators, particulate contamination can inadvertently pass into the sealing system of the separating piston, which can cause failure of the accumulator and any connected hydraulic equipment. As the arising particulate contamination is frequently the result of abrasion on the hydraulic devices, these are generally metallic in nature and any such particles that arise, particularly in the event of mechanical failure, may also be of such a magnitude as to cause the sealing devices on the separating piston along with their elastomer material to leak or even be destroyed.

SUMMARY

A need exists to provide a hydraulic accumulator solution that reduces failures even in the event of metallic particulate contamination arising.

The need is addressed by the subject matter of the independent claim(s). Embodiments of the invention are described in the dependent claims, the following description, and the drawings.

DESCRIPTION

Figure 1:
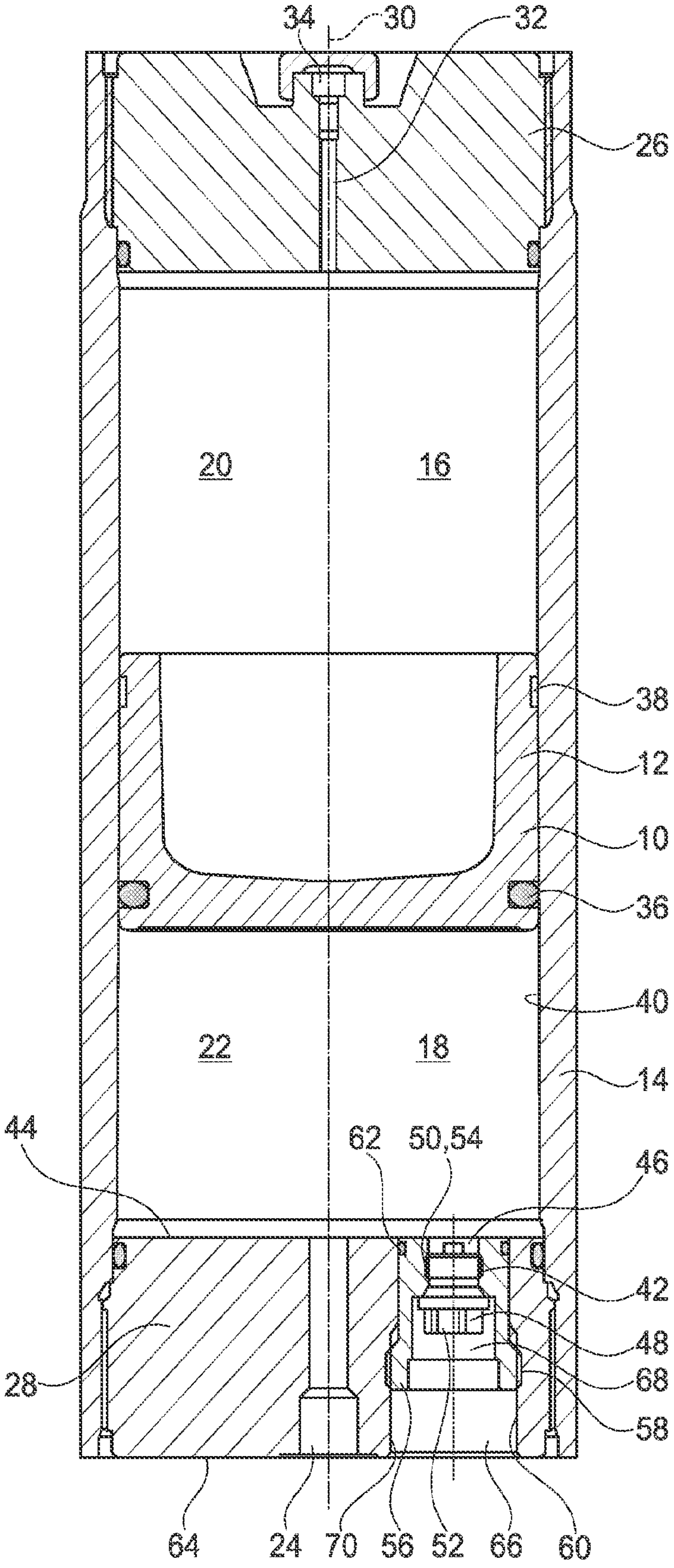
FIG. 1 shows a longitudinal section through the hydraulic accumulator.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, a magnetic-field-generating device is received in a part of the accumulator housing that comprises the fluid port in such a way that magnetisable particles can be separated, in a cleaning manner, from the respective fluid located between the part of the accumulator housing and the separating element in the direction of the magnetic-field-generating device and deposited thereon, this provides an opportunity to allow a strong magnetic field, fixed in position, to arise in the fluid region of the accumulator housing such that magnetisable, in particular metallic, particles are thus collected in a central location, if they were intended to pass onto the liquid side of the accumulator, and thus removed from the fluid, causing no damage, in particular no damage to the separating element, such as a separating piston. In particular, the particulate contamination cannot pass onto the sealing side of the separating piston with its sealing rings and guide bands of a hydropneumatic piston accumulator, which may otherwise, alongside sealing problems, also cause the separating piston inside the accumulator housing to ‘catch’ due to friction, meaning that the separating piston can no longer execute any movements, which would make the hydraulic accumulator in its entirety unusable. In particular, when managing fluid flows where filter devices are at the limits of their capacity, this achieves a means of reliably cleaning metallic, magnetisable particles from the fluid flow by means of magnetic separation in the hydraulic accumulator.

In some embodiments, it is provided that the part of the accumulator housing containing the magnetic-field-generating device is a housing lid that closes a cylindrical wall part of the accumulator housing at one end, which faces a liquid side of the hydraulic accumulator. In a first work step, the housing lid can accordingly be inserted into the cylindrical wall part of the accumulator housing in a cost-effective manner and then, in a second work step, the magnetic-field-generating device is fitted into the housing lid.

In some embodiments, it is provided that the fluid port on the liquid side engages through the housing lid, running in the centre and coaxially with respect to the longitudinal axis of the accumulator housing, and that the magnetic-field-generating device is arranged opposite thereto, off-centred in the housing lid. Both the fluid port and the magnetic-field-generating device can accordingly be accommodated in the housing lid in a space-saving manner. In some embodiments, it would be conceivable to incorporate a plurality of magnetic-field-generating devices in the housing lid. In any event, however, the magnetic-field-generating device is accommodated in the vicinity of the fluid port and thus in the fluid inflow area such that particle extraction from the fluid is directly possible in real time.

In some embodiments, it is provided that the housing lid comprises a flat upper side in the direction of the separating element, opposite which the magnetic-field-generating device is arranged, recessed in a receptacle in the housing lid. Due to the recessed arrangement of the magnetic-field-generating device in the housing lid, as part of the accumulator housing, a collection chamber is formed in which any particles that arise can be deposited without remaining lying on the upper side of the housing lid, which could otherwise cause damage if the piston-like separating element were to impact with the upper side of the housing lid as part of standard operation.

In some embodiments, it is provided that the magnetic-field-generating device is formed by a permanent magnet. However, it is also possible to form the corresponding device from a magnet through which current can be passed, which then assumes that a corresponding energy supply will be provided for the hydraulic accumulator.

For example, in this case, the permanent magnet is designed as a magnetic plug, which can be fixed, in particular screwed, in a non-magnetic insert, and for example the magnetic plug is inserted, or in particular screwed, together with said insert, into the corresponding receptacle in the housing lid. As such, in an assembly embodiment, the insert with the magnetic plug is inserted into the receptacle from an underside of the housing lid which faces away from the separating element. In this manner, the magnetic plug can be replaced and/or liberated of magnetisable particulate contamination as part of a maintenance operation.

In some embodiments, it is provided that, by means of a first recess between the insert and the flat underside of the housing lid and by means of a second recess between the magnetic plug and the free end face of the insert opposite the magnetic plug, a stepped receiving space is created, the free diameter of which widens in stages in the direction of the flat underside of the housing lid. The two aforementioned recesses thus form an enlarged accommodation area, which makes it easier to assemble the insert along with the magnetic plug in the lower housing lid and also to subsequently remove the magnetic plug for cleaning purposes.

In some embodiments, it is provided that the magnetic plug comprises a detection device which responds if a predefined quantity of magnetisable particulate contamination is exceeded. For this purpose, the detection device for example comprises a voltage source, which is connected to a magnetic part of the magnetic plug designed as a pole, said magnetic part being spaced apart from a conductor as the further pole and transmitting a signal to an evaluation unit as soon as an electrical connection is established between the magnetic part and the conductor of the magnetic plug by means of the magnetisable particulate contamination. In this process, a signal threshold can be determined and only when this is exceeded is particulate contamination signalled as being disruptive to the extent that cleaning of the magnetic plug is carried out as necessary as part of maintenance operations.

In conventionally closed hydraulic circuit designs, metallic particles can cause damage to sensitive components such as valves, piston accumulator seals, etc. Specifically in the hydraulic systems of construction machinery, failure or wear of active elements such as valves, cylinders, actuators, etc. may lead to metallic abrasion, which can then be "flushed" through the circuit up to the hydraulic accumulators. Corresponding hydraulic accumulators, in particular piston accumulators, are often used in braking systems with the result that the brake function is restricted or even fails completely by destruction of the piston seal due to the particulate contamination. By using magnetic elements, such as commercially available magnetic plugs, such particles can be removed from the hydraulic fluid, thus extending the lifetime of components of the hydraulic circuit to a significant extent. In any event, using magnetic plugs has the benefit that the respective plug can be manually unscrewed and replaced or cleaned to dispose of the particles as part of maintenance operations. With the aid of the aforementioned contamination switch as a detection device, contamination can be displayed by the magnetisable metallic particles closing the associated current or switching circuit and issuing a signal.

The hydraulic accumulator according to the invention is explained in greater detail below with the aid of an embodiment and with reference to the drawings, which are in outline and not to scale.

A hydraulic accumulator according to a first embodiment is shown in FIG. 1 in the form of a so-called piston accumulator that comprises a separating piston 12 as a separating element 10, said piston separating two fluid chambers 16, 18 arranged in an accumulator housing 14. The upper fluid chamber 16, viewed as shown on FIG. 1, forms a closed accumulator chamber 20 for receiving a working gas, such as nitrogen gas, for example. The lower fluid chamber 18 forms a liquid chamber 22 for the purpose of receiving an operating fluid, such as hydraulic oil for example. The corresponding fluid chamber 18 or liquid chamber 22 respectively is provided with a fluid port 24, by means of which the accumulator, which is not shown in further detail, can be connected to a hydraulic working circuit of the conventional kind.

The accumulator housing 14 is designed as a kind of circular hollow cylinder or cylindrical tube, which, at both free ends thereof, is tightly sealed by a screwed-in housing lid 26, 28 in each case, between which the separating piston 12 is guided coaxially, in a freely displaceable manner, along the longitudinal axis 30 of the housing.

The upper housing lid 26 comprises a through fluid channel 32, which is sealed by a screw plug 34 as shown in FIG. 1. By means of the corresponding arrangement 32, 34, the accumulator can, if necessary, be drained of working gas in chamber 16, for example for maintenance purposes, but the chamber 16 can also be filled if there is insufficient working gas. The separating piston 12 itself is designed as a so-called hollow piston for the purpose of increasing the effective gas volume on the fluid chamber 16 side. The outer circumference of the separating piston 12 is guided along the inside 40 of the cylindrical accumulator housing 14 via at least one sealing ring 36 and at least one guide band 38. When manufacturing practical embodiments, a plurality of such sealing rings and guide bands can be fitted, also in combination with one another, on the outer circumference of the separating piston 12.

The previous design of such a hydraulic accumulator, here in the form of a piston accumulator, is standard and is therefore not described in any further detail, or only insofar as is necessary in order to understand the invention. Thus, a magnetic-field-generating device 42 is received in the lower housing lid 28 as part of the accumulator housing 14, which comprises the fluid or liquid port 24, such that magnetisable, in particular metallic, particles can be separated, in a cleaning manner, from the respective fluid located between the lower housing lid 28 as part of the accumulator housing 14 and the separating element 10 in the form of the separating piston 12 in the direction of the magnetic-field-generating device 42, and deposited on said device. The fluid contained in the fluid chamber 18, or in the liquid chamber 22 respectively, assumes different volumes according to the operating state of the piston accumulator, wherein, particularly as shown on FIG. 1, in the event of a downwards movement of the separating element 10 or separating piston 12 respectively in the direction of the lower housing lid 28, the fluid from the fluid port 24 passes back into the hydraulic circuit and any magnetisable particles located in the chamber 18, 22 are guided in the direction of the magnetic-field-generating device 42 in the bottom of the housing lid 28 and collected here. However, even when the fluid enters the chamber 18, 22 via the fluid port 24, the magnetic force of the magnetic-field-generating device 42 is sufficiently strong to actively attract any magnetisable particles and collect them on the device 42.

Figure 2:
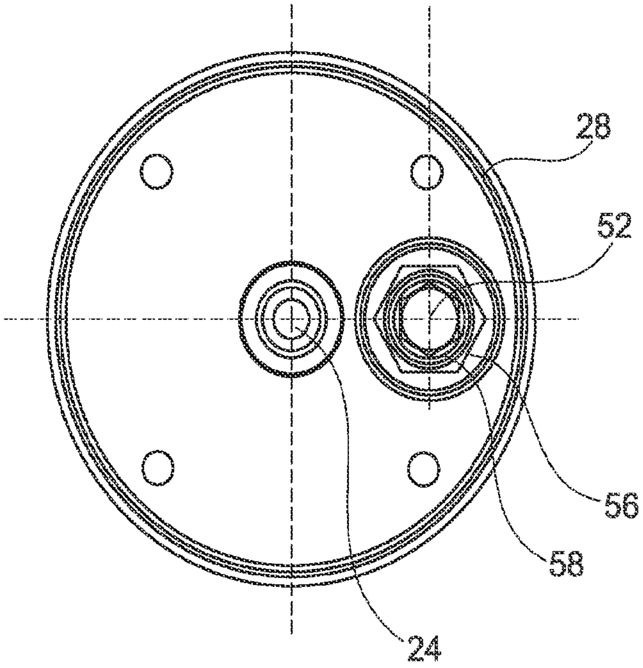
FIG. 2 shows an end view from beneath the hydraulic accumulator according to FIG. 1.

As is shown in FIGS. 1 and 2 in particular, the fluid port 24, which is associated with a liquid side of the hydraulic accumulator with assigned pipework for a hydraulic circuit (not shown), is integrated in the centre of and running coaxially with respect to the longitudinal axis 30 of the accumulator housing 14 in the lower housing lid 28 and engages completely through said housing lid 28. The magnetic-field-generating device 42 is arranged opposite thereto, off-centred in the housing lid 28. As such, the fluid can flow unhindered into the chamber 18, 22 and out of said chamber again in the direction of the hydraulic circuit via the fluid port 24, without this free flow stream being obstructed by the off-centred device 42 generating a magnetic field, which, as such, only serves to separate magnetic particles from the associated fluid flow. If necessary, a plurality of devices 42 of the aforementioned type can be received, grouped around the longitudinal axis 30 of the housing, in the housing lid 28.

As is also shown in FIG. 1, the housing lid 28 comprises a flat upper side 44 in the direction of the separating element 10, opposite which the magnetic-field-generating device 42 is arranged, recessed in a cylindrical receptacle 46 in the housing lid 28. The magnetic-field-generating device 42 for example consists of a permanent magnet; however, it is also possible to use a solenoid through which current can pass on the liquid side at this point in the housing lid 28. However, in this case the permanent magnet is designed as a so-called magnetic plug 48, in other words a conventional screw with a male thread 50 and a screw head 52, which consists entirely of magnetic material or comprises such a material as a material constituent. The magnetic plug 48 is fixed with its male thread 50 in a corresponding female thread 54 of an insert 56, which can be fixed with its male thread 58 attached at the top in a widening into a corresponding female thread 60 in the lower housing lid 28. As is also shown in FIG. 1, the insert 56 has a seal in the form of a sealing ring 62 at its free end face region in the direction of the fluid chamber 18. The insert 56 with the magnetic plug 48 is inserted into the receptacle 46 from the flat underside 64 of the lower housing lid 28 which faces away from the separating element 10. In this case, a first recess 66 is formed between the insert 56 and the flat underside 64 of the housing lid 28 and a further second recess 68 is provided between the magnetic plug 48 and the opposite free end face of the insert 56 opposite the magnetic plug 48. As such, a stepped receiving space 70 is created, the free diameter of which widens in stages in the direction of the flat underside 64 of the housing lid 28 and accordingly makes it easier to screw the magnetic plug 48 into and/or out of the insert 56 in a manner that is particularly conducive to assembly. In this manner, when liquid has been drained out of the hydraulic accumulator, the magnetic plug 48 together with the collected magnetic particles can be removed from the housing lid 28 and, after the particles have been cleaned off, this can be replaced in its position to attract and collect particles from the liquid.

Figure 3:
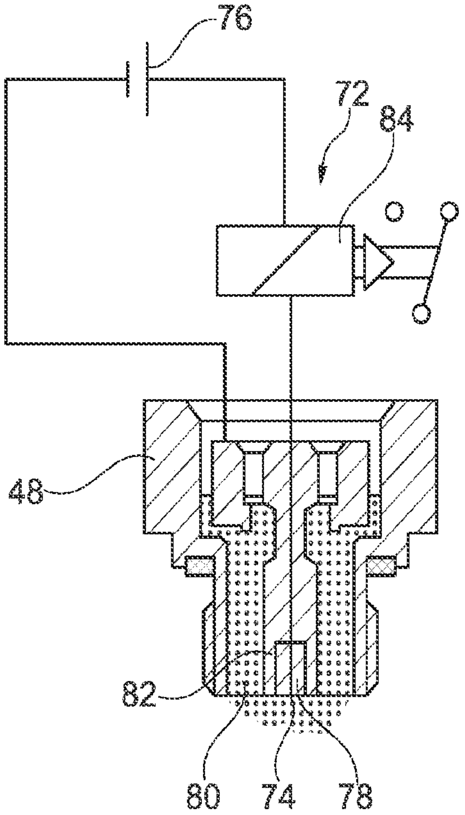
FIG. 3 shows the use of a contamination switch to indicate contamination in a magnetic plug, as used in a hydraulic accumulator solution according to FIGS. 1 and 2.

As shown in FIG. 3 in particular, in a modified embodiment of the magnetic plug 48, said plug can be equipped with a detection device referred to in its entirety as 72, which responds when a predefined quantity 74 of magnetisable particulate contamination is exceeded. Accordingly, the detection device 72 comprises a conventional voltage source 76, which is connected in a current-conducting manner to a magnetic part 78 of the magnetic plug 48 in the form of a pole. The magnetic part 78 is formed by a cylindrical permanent magnet, which is incorporated in the end face of the magnetic plug 48 in a recess thereof. In a concentric arrangement, a hollow-cylindrical electrical conductor 80 surrounds the inner magnetic part 78, wherein a non-conductive sleeve section as a separating sleeve 82 is fitted between the two components 78, 80 to avoid short-circuiting and, as such, the two components 78, 80 are electrically disconnected from one another. Otherwise, the magnetic plug 48 in its entirety can in turn be screwed, by means of its male thread 50, into the corresponding female thread 54 of the insert 56 in the lid part 28.

A relay 84 is wired in the current path between the voltage source 76 and the inner magnetic part 78, said relay serving as a display. As soon as the quantity 74 of magnetisable particles accruing on the magnetic part 78 of the magnetic plug 48 is sufficient to bridge the separating sleeve 82 in the direction of the electrical conductor 80 with the particulate contamination, an electrical connection arises between the magnetic part 78 and the conductor 80 and, as a result, the relay 84 responds, which, when switched, transmits a display for the corresponding degree of particulate contamination reached on the magnetic plug 48 to an operator. The operator would then, as part of maintenance and in order to clean the magnetic plug 48 on its free end face, remove said plug from the insert 56 in the housing lid 28 and replace it again after cleaning. As such, a kind of contamination switch is formed by the device according to FIG. 3 to indicate contamination on the magnetic plug 48. Apart from the permanent magnet 78 and the electrical conductor 80, the other parts of the magnetic plug 48 are in this case for example made from non-metallic material, for example from an appropriate synthetic material.

Specifically in construction machinery, failure or wear of active elements such as valves, operating cylinders or actuators respectively may lead to metallic abrasion, which can then be "flushed" through the circuit up to the hydraulic accumulators. Corresponding hydraulic accumulators are generally also used in braking systems of corresponding operating machinery such as agricultural or construction machinery, as a result of which destruction of the seal of the separating piston 12 due to metallic particles restricts or even completely obstructs operation.

By using magnetic elements, such as in the form of a magnetic plug 48 in this case, which, according to the embodiment in FIG. 3, may only comprise a permanent magnet 78 in its foremost free end region, such magnetisable metallic particles can be extracted from the hydraulic fluid and thus the service life of components can be extended. By 'fishing out' such particles by means of a magnetic-field-generating device 42 in the variable chamber volume between the separating element 10 and the lower housing lid 28 in closed hydraulic circuits, this prevents the corresponding metallic particles leaving the hydraulic accumulator and potentially causing damage to sensitive components such as valves, piston accumulators, seals, etc., with the result that all components of a hydraulic circuit are protected from such adverse effects. This therefore has no parallel in the prior art.

The magnetisable particle separation device does not need to be restricted to piston accumulator solutions as described above but can instead also be used in other accumulator solutions with a separating element, such as bladder accumulators, membrane accumulators and bellows accumulators. Furthermore, if necessary, a valve may also be inserted in the fluid port 24, such as, for example, a conventional design of disc valve used for bladder accumulators, without impairing the action of the magnetic-field-generating device 42 incorporated in the housing lid 28.

The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A hydraulic accumulator, comprising a separating element, which is arranged in an accumulator housing and separates two fluid chambers in a fluid-tight manner, a fluid port being connected in a fluid-conducting manner to one of the fluid chambers, wherein a magnetic-field-generating device is received in a part of the accumulator housing that comprises the fluid port in such a way that magnetisable particles can be separated, in a cleaning manner, from the respective fluid located between the part of the accumulator housing and the separating element in the direction of the magnetic-field-generating device, and deposited on said device; wherein the part of the accumulator housing containing the magnetic-field-generating device is a housing lid that closes a cylindrical wall part of the accumulator housing at one end, which faces a liquid side;

the fluid port of the liquid side engages through the housing lid, running in the center and coaxially with respect to the longitudinal axis of the accumulator housing, and wherein the magnetic-field-generating device is arranged opposite thereto, off-centered in the housing lid; and wherein the housing lid comprises a flat upper side in the direction of the separating element, opposite of which the magnetic-field-generating device is arranged, recessed in a receptacle, in the housing lid.

2. The hydraulic accumulator of claim 1, wherein the magnetic-field-generating device consists of a permanent magnet.

3. The hydraulic accumulator of claim 1, wherein the permanent magnet is designed as a magnetic plug, which can be fixed in a non-magnetic insert.

4. The hydraulic accumulator of claim 1, wherein the insert with the magnetic plug is inserted into the receptacle from the underside of the housing lid, which faces away from the separating element.

5. The hydraulic accumulator of claim 1, wherein, using a first recess between the insert and the flat underside of the housing lid and using a second recess between the magnetic plug and the free end face of the insert opposite the magnetic plug, a stepped receiving space is created, the free diameter of which widens in stages in the direction of the flat underside of the housing lid.

6. The hydraulic accumulator of claim 1, wherein the magnetic plug comprises a detection device, which responds if a predefined quantity of magnetisable particulate contamination is exceeded.

7. The hydraulic accumulator of claim 1, wherein a detection device comprises a voltage source, which is connected to a magnetic part of the magnetic plug designed as a pole, said magnetic part being spaced apart from a conductor as a further pole and transmitting a signal to an evaluation unit as soon as an electrical connection is established between the two poles of the magnetic plug by means of the magnetisable particulate contamination.

8. The hydraulic accumulator of claim 1, wherein the permanent magnet is designed as a magnetic plug, which can be inserted in a non-magnetic insert.

9. The hydraulic accumulator of claim 1, wherein the permanent magnet is designed as a magnetic plug, which can be screwed into a non-magnetic insert.

10. The hydraulic accumulator of claim 1, wherein the permanent magnet is designed as a magnetic plug, which can be fixed in a non-magnetic insert, and screwed, together with the insert, into the corresponding receptacle in the housing lid.

11. The hydraulic accumulator of claim 1, wherein the hydraulic accumulator is in the form of a piston accumulator.

12. A hydraulic accumulator, comprising a separating element, which is arranged in an accumulator housing and separates two fluid chambers in a fluid-tight manner, a fluid port being connected in a fluid-conducting manner to one of the fluid chambers, wherein a magnetic-field-generating device is received in a part of the accumulator housing that comprises the fluid port in such a way that magnetisable particles can be separated, in a cleaning manner, from the respective fluid located between the part of the accumulator housing and the separating element in the direction of the magnetic-field-generating device, and deposited on said device wherein, using a first recess between the insert and the flat underside of the housing lid and using a second recess between the magnetic plug and the free end face of the insert opposite the magnetic plug, a stepped receiving space is created, the free diameter of which widens in stages in the direction of the flat underside of the housing lid.

* * * * *